Aug. 15, 1961

R. GARDNER, JR., ET AL 2,996,600

METHOD OF WELDING TUBULAR HEAT EXCHANGER PARTS

Filed March 28, 1957

INVENTORS
Raymond Gardner, Jr.
BY Anthony J. Ryder

Frease & Bishop
ATTORNEYS

Aug. 15, 1961  R. GARDNER, JR., ET AL  2,996,600
METHOD OF WELDING TUBULAR HEAT EXCHANGER PARTS
Filed March 28, 1957  2 Sheets-Sheet 2

INVENTORS
Raymond Gardner, Jr. and
BY Anthony J. Ryder
Frease & Bishop
ATTORNEYS United States Patent Office 2,996,600
Patented Aug. 15, 1961

2,996,600
METHOD OF WELDING TUBULAR HEAT EXCHANGER PARTS
Raymond Gardner, Jr., and Anthony J. Ryder, Massillon, Ohio, assignors to The Griscom-Russell Company, Massillon, Ohio, a corporation of Delaware
Filed Mar. 28, 1957, Ser. No. 649,036
3 Claims. (Cl. 219—61)

The invention relates to methods of welding tubular heat exchanger parts and more particularly to methods of internally arc welding various sizes of small-diameter cylindrical or tubular heat exchanger parts in end-butted relation.

Recent designs of heat exchangers have required the internal welding of small-diameter tubular parts end-butted together to form a sound weld which could be inspected externally and internally after welding. A heat exchanger construction including such welded joints is shown in the copending application of Karl A. Gardner, Raymond Gardner, Jr. and Frank Boni, Jr., filed March 28, 1957, Serial No. 649,037, Patent No. 2,911,200; and a rotatable arc welding tool for carrying out a shielded arc welding operation is shown in the copending application of Raymond Gardner, Jr., filed March 28, 1957, Serial No. 649,186, Patent No. 2,868,953.

The formation of such an internally welded joint is not without difficulty because of the small-diameter tubular elements involved, the thinness of the tubular walls to be welded in end-butted relation, and the types of steel or alloy steels or non-ferrous alloys which must be used.

Thus, one or both of the tubular parts to be welded may be formed, for example, of carbon steel, or stainless steel, or an alloy steel containing 2¼% chromium and ½% molybdenum, or an alloy steel containing 5% chromium and ½% molybdenum. Some of these materials have poor weldability and it is necessary to critically control the composition of the metal at the welded joint.

Furthermore, it is necessary to maintain axial alignment of the tubular parts being welded and end-butted together during the welding operating which may involve fusing the metal at the welded zone accompanied by pressing the end-butted parts toward each other, or fusing the metal at the welded zone and supplying prepared filler metal to the welded zone from a consumable part assembled therewith.

These difficulties are further complicated because in the construction of heat exchangers requiring such a welded joint between closely nested small-diameter tubes and a tube sheet, there is insufficient space available for using a jig or fixture surrounding the parts to be welded at the location of the weld for holding the parts in alignment during welding. Furthermore, the interior of the end-butted tubular parts is not available for the insertion of jigs or fixtures to hold the parts in alignment during welding, as this space must be occupied by the rotatable welding tool used in carrying out the welding operation.

Accordingly, it is a general object of the present invention to provide a new method of internally welding tubular parts in end-butted relation which overcomes the described difficulties and satisfies the existing need in the art.

Also, it is an object of the present invention to provide a new method of internally welding end-butted tubular parts together by which the end-butted parts may be held in alignment during the welding operation without the use of jigs or fixtures located immediately inside of or outside of the welded joint to be formed.

Furthermore, it is an object of the present invention to provide a new method of internally welding end-butted tubular parts in which quality control of the resulting weld can be maintained and a sound weld formed between parts composed of metals which are normally difficult to weld.

Finally, it is an object of the present invention to provide a new method of internally welding small-diameter tubular parts end-butted together which overcomes existing problems in the art, avoids the described difficulties and obtains many new results and advantages, and which may be carried out without prohibitive controls in the welding process.

These and other objects and advantages apparent to those skilled in the art from the following description and claims may be obtained, the stated results achieved, and the described difficulties overcome by the discoveries, methods, steps, and procedures, which comprise the present invention, the nature of which is set forth in the following general statement, preferred embodiments of which—illustrative of the best modes in which applicants have contemplated applying the principles—are set forth in the following description, and which are distinctly and particularly pointed out and set forth in the appended claims forming part hereof.

The nature of the improved method of internally welding end-butted tubular parts together particularly adapted for the formation of welded joints between the tubes and a tube sheet in the construction of a heat exchanger may be stated in general terms as including, providing two tubular metal parts to be welded together in end-butted relation, forming a shoulder flange by flaring or thickening the end of one of the end-butted parts, telescoping the end of the other part within the shoulder flange, holding the end-butted parts in said telescopic arrangement to maintain alignment of the parts, internally applying welding heat progressively circumferentially around the zone of abutment to fuse the end-butted metal, and pressing the end-butted parts together while the metal is being fused.

The improved method is illustrated somewhat diagrammatically in the accompanying drawings forming part hereof in which.

Figure 7:
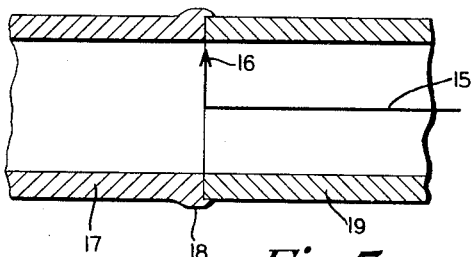
Figure 9:
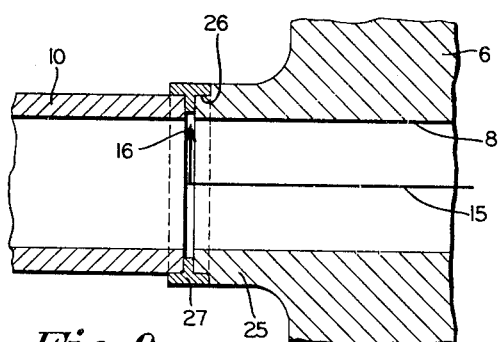
Figure 8:
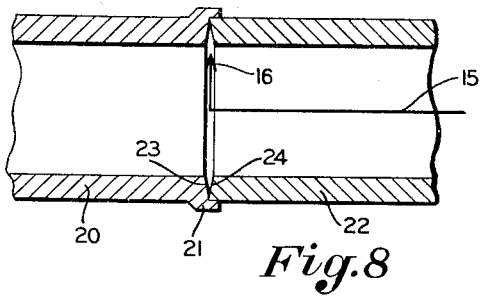
Figure 11:
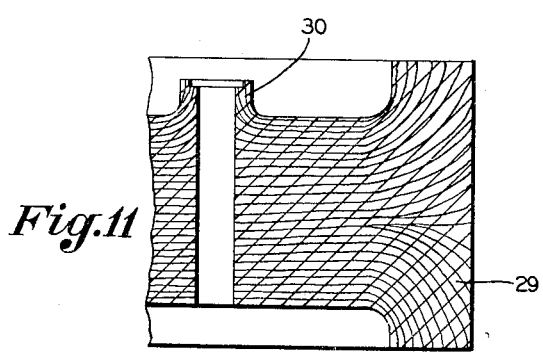
Figure 10:
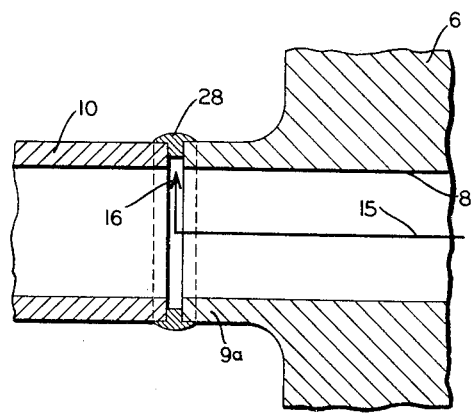
Figure 12:
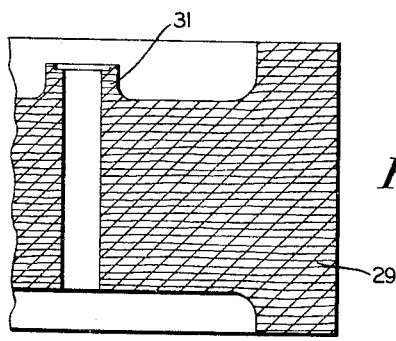

FIGS. 7 and 8 diagrammatically illustrate two ways of welding the butted ends of tubes together in accordance with the invention;

FIGS. 9 and 10 illustrate alternate procedures where filler metal is supplied to the welded joint; and FIGS. 11 and 12 illustrate digrammatically the grain flow lines in a tube sheet in which integral tubular extensions on the shell side of the tube sheet are provided by different fabricating procedures for being welded to heat exchanger tubes.

Similar numerals refer to similar parts throughout the various figures of the drawings.

Figure 1:
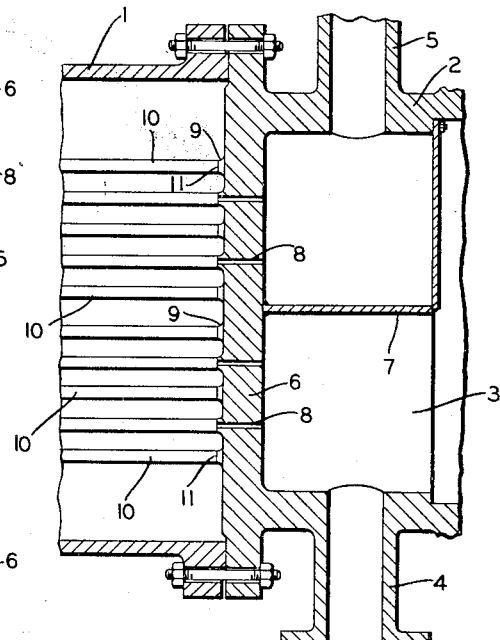
FIGURE 1 is a fragmentary sectional view of a heat exchanger having tubes internally welded to tubular extensions on the shell side of the tube sheet in accordance with the improved method.

A typical heat exchanger is illustrated generally in FIG. 1 including a shell 1, head barrel walls 2 forming a head chamber 3, a tube fluid inlet 4, a tube fluid outlet 5, a tube sheet 6 separating the shell 1 and head chamber 3, and pass separation partitions 7.

The tube sheet 6 is provided with the desired number of tube openings 8 spaced as closely as possible together to obtain a compact tube bundle arrangement. As disclosed in said copending application of Karl A. Gardner, Raymond Gardner, Jr. and Frank Boni, Jr., Serial No. 649,037, the tube sheet may be formed with integral extensions 9 to which the ends of the tubes 10 are internally welded at 11.

Figure 2:
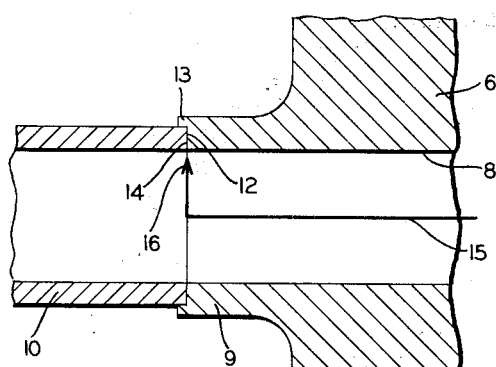
FIG. 2 is a diagrammatic view illustrating the end of a tube held in alignment within a shoulder flange formed on the end of a tubular extension projecting from a tube sheet prior to welding.
Figure 3:
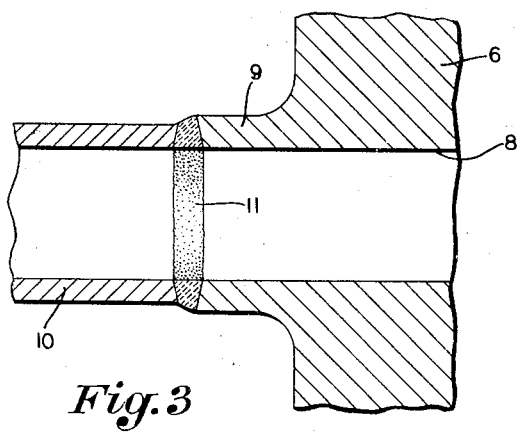
FIG. 3 is a view similar to FIG. 2 showing the parts after completing the welding operation.

In accordance with the present invention, and referring to FIGS. 2 and 3, the tubular extensions 9 formed integrally of the tube sheet 6 have a radial wall thickness greater than the wall thickness of the tubes 10 and the outer end 12 of each tubular extension 9 is formed with an axially-projecting circumferentially-extending shoulder flange 13 within which the end 14 of tube 10 is telescoped and held in abutment against the end 12 of tubular extension 9.

The end-butted tubular parts 9 and 10 are held in the end-butted relation shown in FIG. 2 during the welding operation which may be performed by inserting a rotatable arc welding tool diagrammatically indicated at 15 into the tube opening 8 in tube sheet 6. The shielded arc tip of the welding tool 15 is indicated diagrammatically by the arrow 16 and this tip may be rotated within the end-butted tubular parts 9 and 10 to supply heat through an arc between the tip 16 and the internal zone of the butted ends of the tubular parts 9 and 10 progressively, circumferentially, internally around the butted metal zone including the shoulder flange 13, to form the weld 11 which fully penetrates and fuses the adjoining parts as illustrated in FIG. 3. The welding operation may be performed by fusing the metal which forms the weld 11 while the parts are held in the relative positions illustrated in FIG. 2, or additional pressure may be applied axially of the parts as the weld metal is being fused.

The shoulder flange 13 within which the end of the tube 10 is telescoped has a two-fold purpose. First, the flange 13 establishes and maintains the parts in axial alignment throughout the welding operation so that the parts are in axial alignment after the weld has been completed as shown in FIG. 3. In addition, the shoulder flange 13 serves as a filler metal to avoid sagging of the surface at the outer periphery of the weld 11. Before welding the abutted ends of the tubular members 9 and 10 and the shoulder flange 13 have separating surfaces and very small clearance spaces or crevices therebetween. Inasmuch as the weld 11 fully penetrates the tubular members 9 and 10 as well as the shoulder flange 13, the welded members are completely devoid of separating interfaces and crevices. Thus prior to the weld the shoulder flange 13 is a consumable integral part of one tube and becomes fused to the other tube as a result of the welding operation.

Figure 4:
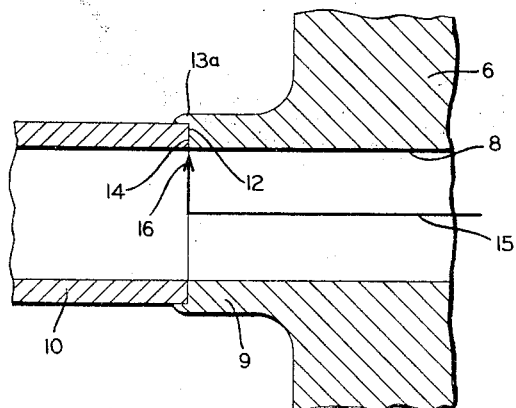

The procedure may be modified as shown in FIG. 4 to provide a shoulder flange 13a with a rounded contour rather than the angular shoulder flange 13 illustrated in FIG. 2. Otherwise, the welding procedure may be carried out to weld the parts shown in FIG. 4 together in the same manner as described in connection with FIG. 2.

Figure 5:
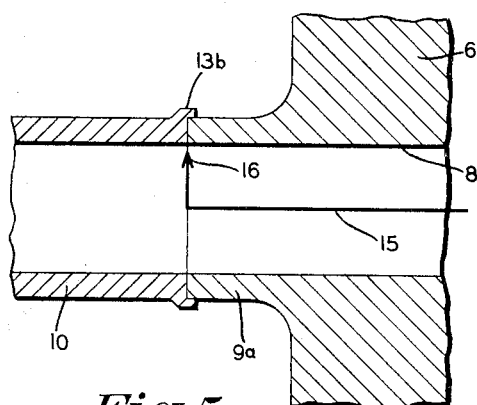
FIGS. 4, 5 and 6 are views similar to FIG. 2 illustrating modified arrangements of the aligning shoulders formed on one of the tubular parts.

Alternatively, as illustrated in FIG. 5, the shouldered flange 13b may be formed on the end of the tube 10, rather than on the tubular extension 9a integrally connected with the tube sheet 6, by flaring and thickening somewhat the end of the tube 10 to be butted against the end of the extension 9a. With this arrangement, the radial thickness of the tubular extension 9a may be the same as the tube wall thickness of the tube 10.

Figure 6:
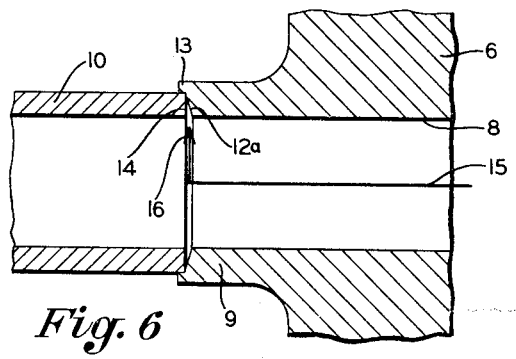

Alternatively, as shown in FIG. 6, one or both of the end surfaces of the tubular extension 9 and tube 10 which are to be butted together and held in alignment by the shoulder flange 13 may be tapered, the end surface 12a of the tubular extension 9 being illustrated as being tapered in FIG. 6.

The parts to be internally welded together in end-butted relation need not necessarily comprise a tube 10 and a tubular extension 9 integral with a tube sheet, since the new welding procedure may be used to weld two tubes together in end-butted relation as shown in FIGS. 7 and 8. In FIG. 7, the end of one of the tubes 17 is flared or thickened to provide a shoulder flange formation 18 holding the end of the other tube 19 in alignment, the contour of the shoulder flange 18 being somewhat like the contour of the shoulder flange 13a illustrated in FIG. 4. In FIG. 8, the tube 20 may be formed with a shoulder flange 21 of different contour receiving and aligning the end of tube 22. Also, both tubes 20 and 22 may be formed with tapered end surfaces 23 and 24 respectively.

When it is necessary to form a welded joint between tubular parts fabricated of certain metals which may be difficult to weld, it may be necessary to supply special filler metal to the weld as it is being formed, from prepared filler metal having the necessary chemical or metallurgical characteristics to obtain the desired weld. This may be accomplished by utilizing a back-up ring formed of prepared filler metal which is partially or wholly consumed in forming the weld, as illustrated in FIGS. 9 and 10. In FIG. 9, the integral tube sheet extension 25 may have a thicker wall thickness than that of the tube 10 and the end of extension 25 may be formed with a recessed circumferential shoulder 26 over which one flange of a filler metal ring 27 formed of metal having the desired composition, and having, for example, a T-shaped cross section, may be engaged.

Thus, as shown in FIG. 9, the end of tube 10 to be butted toward the end of extension 25 in forming the internal weld may be telescoped within the other flange of the filler metal ring 27. As the welding operation progresses the filler metal in the consumable back-up ring 27 is consumed and forms part of the resulting weld. Meanwhile the tubular parts held in alignment are maintained pressed toward each other while the weld is being formed.

FIG. 10 illustrates a filler metal back-up ring 28 of a slightly different shape and contour, which may be used to form an internally welded joint between a tube 10 and a tubular extension 9a connected integrally with the tube sheet 6 having the same radial wall thickness as the wall thickness of the tube 10.

Where the welded joint is to be formed between two end-butted tubular parts, one of which is an extension from the shell side surface of a tube sheet of a heat exchanger, additional strength may be developed in the tube sheet to satisfy high-pressure or high-temperature requirements if the tube sheet is formed as a forging. FIG. 11 illustrates diagrammatically a tube sheet 29 which is formed as a forging to provide the integral extensions 30 to which the tube ends may be internally welded. When the tube sheet is thus formed as a forging, the grain flow lines in the metal of the forged product may run in the manner diagrammatically illustrated in FIG. 11 so as to extend outwardly of the tubular extensions 30. In this manner the tubular extensions 30 and their connection with the tube sheet 29 have greater strength than when the tube sheet is formed by machining the surfaces of a metal blank to form extensions 31 as illustrated in FIG. 12. When the tube sheet is fabricated by machining operations, the grain flow lines in the metal blank are cut as illustrated in FIG. 12.

In accordance with the present invention, internal welds may be formed between two end-buted tubular parts while held in alignment during the welding operation with the wall thickness of either tubular part equal to or greater than the wall thickness of the other. Where the wall thicknesses of the two tubular parts are equal, one of the parts is flared or upset at its end to provide the aligning shoulder flange.

Use of the improved method demonstrates that the internal weld such as indicated at 11 in FIG. 3 may be made with an internal weld surface relatively smooth and substantially of the same diameter as the diameter of the end-butted tubular parts which are welded together and have the same internal diameter as shown. The weld has such favorable characteristics in this respect that ordinarily no reaming operation is required. However, if the resulting weld becomes enlarged so as to result in a smaller diameter for the welded area, a reaming operation may be performed to eliminate any restriction to flow through the welded tubular parts.

The new welding procedure of the present invention thus enables sound welds to be formed internally of end-butted tubular parts with alignment of the parts maintained during the welding operation. The self-aligning feature is utilized whether the tubular parts include a tube and an extension on a heat exchanger tube sheet or comprise two tubes. The improved welding procedure also provides an integral backing-up and reinforcement of the metal at the zone of welding by the shoulder flange provided at the end of one of the end-butted parts.

The welding procedure of the present invention also provides a means for facilitating the welding operation, which means serves first for readily aligning the tubular parts before welding, maintaining the alignment during welding, and serving as filler metal for the outer periphery of the welded zone. The means may be either in the form of a shoulder flange integral with either tubular member, or where it is necessary to supply a particular metallurgical filler metal to the welded zone, said means may be in the form of a separate metal ring.

Furthermore, one or both ends of the end-butted parts may be tapered, as illustrated, to control penetration of and the inside weld contour of the weld to be formed, if necessary.

Accordingly the invention provides a new method of internally welding tubular parts in end-butted relation and particularly small-diameter tubular parts in which the parts are held in alignment during the welding operation without the use of jigs or fixtures located immediately inside of or outside of the welded joint; in which quality control of the resulting weld can be maintained and a sound weld formed between parts composed of metals which are normally difficult to weld; which overcomes existing problems in the art, avoids the described difficulties and obtains the indicated results and advantages; and which may be carried out without prohibitive controls in the welding process.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved method illustrated and described herein are by way of example, and the scope of the invention is not limited to the exact details shown.

Having now described the various features, discoveries, and principles of the invention, the preferred steps in carrying out the new method, and the advantageous, new and useful results obtained thereby; the new and useful methods, steps and procedures, and mechanical equivalents apparent to those skilled in the art, are set forth in the appended claims.

We claim:

1. The method of forming a sound welded joint capable of external and internal inspection between axially-aligned, end-butted, small-diameter, thin-walled, tubular heat exchanger parts comprising a tube sheet having closely spaced relatively short tubular extensions and relatively long tubular members which are exteriorly inaccessible at the joint for use of a joint forming welding tool and internally unavailable for use of a welding fixture together with a welding tool at and adjacent the joint to be formed; which includes the steps of providing a heat exchanger tube sheet with closely spaced relatively short tubular metal part extensions for the tube sheet openings, providing relatively long tubular metal parts to be joined to said tubular part extensions, the tubular metal parts having the same inside diameter, providing for each joint to be formed one of the tubular parts with a wall thickness at least as great as that of the other, providing each part with an abutment end, providing one of the parts with a thickened circumferentially extending axially directed metal shoulder flange surrounding and projecting axially beyond the abutment end of said one part, telescoping the end of the other part within said flange with the abutment ends of the two parts in end-butted relation, holding said parts in end-butted telescoped relation to maintain the tubular parts in axial alignment, applying shielded-arc welding heat by means of a rotatable welding tool inserted through the tube sheet opening progressively internally circumferentially around the zone of abutment, fusing with the welding heat the metal in the ends of the end-butted parts at said zone and in said shoulder flange, said fusion progressing and penetrating from the interior to the exterior of the end-butted parts and shoulder flange, and the fusion of the shoulder flange supplying filler metal for the resultant weld.

2. The method defined in claim 1 in which the end-butted parts are pressed axially toward each other during welding fusion.

3. The method of forming a sound welded joint capable of external and internal inspection between axially-aligned, end-butted, small-diameter, thin-walled, tubular heat exchanger parts comprising a tube sheet having closely spaced relatively short tubular extensions and relatively long tubular members which are exteriorly inaccessible at the joint for use of a joint forming welding tool and internally unavailable for use of a welding fixture together with a welding tool at and adjacent the joint to be formed; which includes the steps of providing a heat exchanger tube sheet with closely spaced relatively short tubular metal part extensions for the tube sheet openings, providing relatively long tubular metal parts to be joined to said tubular part extensions, the tubular metal parts having the same inside diameter, providing for each joint to be formed one of the tubular parts with a wall thickness greater than that of the other, providing each part with an abutment end, providing said thicker part with a circumferentially extending axially directed metal shoulder flange surrounding and projecting axially beyond the abutment end of said thicker part, telescoping the end of the other part within said flange with the abutment ends of the two parts in end-butted relation, holding said parts in end-butted telescoped relation to maintain the tubular parts in axial alignment, applying shielded arc welding heat by means of a rotatable welding tool inserted through the tube sheet opening progressively internally circumferentially around the zone of abutment, fusing with the welding heat the metal in the ends of the end-butted parts at said zone and in said shoulder flange, said fusion progressing and penetrating from the interior to the exterior of the end-butted parts and shoulder flange, and the fusion of the shoulder flange supplying filler metal for the resultant weld.

References Cited in the file of this patent

UNITED STATES PATENTS

| 993,883 | Schickert | May 30, 1911 |
|---|---|---|
| 1,220,772 | Murray | Mar. 27, 1917 |
| 1,313,542 | Jones | Aug. 19, 1919 |
| 1,716,195 | Stockstrom | June 4, 1929 |
| 1,741,121 | Winslow | Dec. 24, 1929 |
| 1,935,063 | Scott | Nov. 14, 1933 |
| 1,981,850 | Fisher | Nov. 27, 1934 |

(Other references on following page)

UNITED STATES PATENTS

| | | |
|---|---|---|
| 2,446,481 | Letterman | Aug. 3, 1948 |
| 2,659,966 | Turnbull | Nov. 24, 1955 |
| 2,807,445 | Gardner | Sept. 24, 1957 |
| 2,911,200 | Gardner et al. | Nov. 3, 1959 |

FOREIGN PATENTS

| | | |
|---|---|---|
| 706,015 | Great Britain | Mar. 24, 1954 |
| 494,326 | Italy | May 19, 1954 |
| 1,072,981 | France | Sept. 17, 1954 |
| 519,248 | Canada | Dec. 6, 1955 |